United States Patent Office 3,230,246
Patented Jan. 18, 1966

3,230,246
PROCESS FOR PREPARING OLEFINICALLY UNSATURATED NITRILES
James L. Callahan, Bedford, and Ernest C. Milberger, Maple Heights, Ohio, assignors to The Standard Oil Company, Cleveland, Ohio, a corporation of Ohio
No Drawing. Filed Nov. 28, 1962, Ser. No. 240,733
5 Claims. (Cl. 260—465.3)

The present invention relates to an improvement in the process for the manufacture of an olefinically unsaturated nitrile by the reaction of ammonia and oxygen with an olefin, and more particularly, pertains to an improvement in the manufacture of an olefinically unsaturated nitrile such as acrylonitrile by a process which involves the catalytic vapor phase reaction of ammonia, oxygen and propylene in a plurality of reaction compartments. The present process has special application to the production of acrylonitrile and methacrylonitrile from propylene and isobutylene, respectively.

In its broadest aspect, the process comprises contacting a mixture comprising a monoolefin having from 3 to 4 carbon atoms such as propylene, ammonia and oxygen with a fluidized solid catalyst at an elevated temperature, at atmospheric or near atmospheric pressure in a plurality of semi-isolated fluidized beds.

The preferred reactants in this invention are a monoolefin having the structure

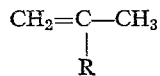

wherein R is a member selected from the group consisting of hydrogen and a methyl radical such as propylene or isobutylene, ammonia, and oxygen. Any source of oxygen may be employed. The molar ration of oxygen to olefin in the feed to the reaction vessel should be in the range of 0.5:1 to 3:1 and a ratio of about 1:1 to 2:1 is preferred.

The presence of saturated hydrocarbons, propane or n-butane, for instance, in the feed mixture does not appear to influence the reaction to any appreciable degree and these materials appear to act only as diluents. Consequently, the presence of saturated hydrocarbons in the feed to the reactor is contemplated within the scope of this reaction. Similarly, other inert gaseous diluents such as nitrogen and the oxides of carbon may be present in the reaction mixtures without deleterious effect.

The molar ratio of ammonia to olefin in the feed may vary between about 0.05:1 to 5:1. There is no real upper limit for the ammonia-olefin ratio, but there is generally no point in exceeding the 5:1 ratio. At ammonia-olefin ratios appreciably less than the stoichiometric ratio of 1:1, various amounts of oxygenated derivatives of the olefin will be formed.

The presence of water in the feed mixture is within the scope of the present process. Improvements have been observed in reactions carried out in the presence of water as compared to similar runs made in the absence of added water. Consequently, the presence of water has a marked beneficial effect on this reaction, but reactions not including water in the feed are not meant to be excluded from this invention.

In general, the molar ratio of water to olefin should be at least about 0.25:1. Ratios on the order of 1:1 are particularly desirable but higher ratios may be employed, i.e., up to about 10:1. Because of the recovery problems involved, it is generally preferred to use only so much water as is necessary to obtain the desired improvement in yield. It is to be understood that water does not behave only as a diluent in the reaction mixture, although the exact manner in which the water affects the reaction is not understood.

Any one or more of several catalysts which will function in the reaction between propylene, oxygen and ammonia to produce acrylonitrile are useful in the present process. A particularly desirable group of catalysts for the purposes of the present process which are more fully disclosed in U.S. Patents Nos. 2,904,580; 3,044,966 and 3,050,546 are the bismuth, tin, and antimony salts of phosphomolybdic acid and molybdic acids, bismuth silicomolybdate, bismuth silicophosphomolybdate, and bismuth phosphotungstate, and these a bismuth phosphomolybdate is preferred. Other catalysts which are useful in the present invention include the combined oxides of bismuth and molybdenum, bismuth, molybdenum and optionally phosphorus, promoted by the addition of the oxides of barium and silicon, the combined oxides of antimony and uranium, antimony and iron, antimony and thorium, antimony and cerium, and antimony and manganese which are disclosed in the copending U.S. patent applications of J. L. Callahan, B. Gertisser and J. J. Szabo, Serial No. 190,038, filed April 25, 1962, and Serial No. 197,932, filed May 28, 1962, and those of J. L. Callahan and B. Gertisser, Serial Nos. 201,321 and 201,329, filed June 11, 1962 both now abandoned, and Serial Nos. 230,684; 230,717 and 230,741, filed October 15, 1962.

Still other catalysts which are useful in the process of the present invention are disclosed in Belgian Patents Nos. 592,434; 593,097; 598,511; 603,030; 612,136; 615,605 and 603,031, Canadian Patent No. 619,497, French Patent No. 1,278,289, British Patents Nos. 874,593 and 904,418, and U.S. Patent No. 2,481,826.

The catalysts useful in the present invention may be used alone or supported on or impregnated in a carrier material. Any suitable carrier material may be used, including silica, alumina, and the like. In general, the support will be employed in amounts less than 90% by weight of the final catalyst composition.

The catalyst may be prepared by any of the numerous methods of catalyst preparation which are known to those skilled in the art. For instance, the catalyst may be manufactured by co-gelling the various ingredients. The co-gelled mass may be dried in accordance with conventional techniques. The catalyst may be spray-dried, extruded as pellets or formed into spheres in oil as is well-known in the art. Alternatively, the catalyst components may be mixed with a support in the form of a slurry followed by drying, or may be impregnated on silica or other support. The catalyst may be prepared in any convenient form as, for instance, small particles suitable for use in the fluidized bed reactor. For the purpose of the present invention, a catalyst having a particle-size between 1 and 500 microns is preferred.

The temperature at which the reaction is carried out may be any temperature in the range of 550 to 1000° F. The preferred temperature range is from about 800 to 950° F.

The pressure the which at reaction is conducted is also an important variable, and the reaction should be carried out at about atmospheric or slightly above atmospheric (2 to 3 atmospheres) pressure. In general, high pressures, i.e., above 250 p.s.i.g., are not suitable for the process since higher pressures tend to favor the formation of undesirable by-products.

The apparent contact time employed in the process is not especially critical. Contact times in the range of 0.1 to 50 seconds may be employed. The apparent contact time may be defined as the length of time in seconds which a unit volume of gas measured under the conditions of reaction is in contact with the apparent unit volume of catalyst. It may be calculated, for instance, from the apparent volume of the catalyst bed, the average temperature and pressure of the reaction, and the flow rates in the vessel of the components of the reaction mixture. The optimum contact time will, of course, vary depending upon the olefin being treated; but, in general, it may be said that a contact time of 1 to 15 seconds is preferred.

In general, any apparatus of the type suitable for carrying out reactions involving contacting vapors with a suspended powdered solid may be used in the present process. The process may be carried out either continuously or intermittently. The only requirement for the reactor used in the present invention is that it be made up of at least two chambers or compartments which communicate with one another and are separated one from the other by at least one foraminous member. More preferred is the process carried out in a reactor of the aforementioned type having at least four compartments, each communicated with and being separated from the next adjacent one by a foraminous member. The preferred apparatus comprises a column containing a plurality of foraminous members or perforated trays stacked horizontally through the length of the column. The perforations in the trays, gas velocities and particle size of the catalyst are sufficiently controlled to give a self-regulating type of reaction of optimum conversions and yields.

The process of the present invention produces unexpectedly superior results in comparison with the results obtained under the same conditions in a conventional single compartment fluidized catalyst apparatus wherein the single compartment has the same volume as the total combined volumes of the multi-compartment reactor described above.

The reactor is preferably a flat, round or cone bottom tube constructed of metal, such as stainless steel, or other suitable material and closed at the bottom. Near to and up from the bottom of the tube there may be transversely mounted one or more reactant gas distribution grids or distribution "spiders" as is well-known in the art. This distribution grid serves both as a catalyst support and as a sparging grid for air or oxygen which is introduced below the grid. A second sparger grid may be placed near the bottom of the reactor for dispersing the olefin and ammonia, if so desired. More details concerning the sparger grid may be found in U.S. Patents Nos. 2,893,849; 2,893,851 and 2,975,037.

The foraminous members which separate one communicating compartment from another in the reactor are generally mounted transversely within the reactor and may be screens, gratings, perforated plates, cones or pyramidal-shaped plates or one or more of the types, and arranged in one or more of the fashions, more fully disclosed in U.S. Patents Nos. 2,433,798; 2,730,556; 2,740,- 698; 2,823,219; 2,847,360; 2,893,849; and 2,893,851, as well as in the article appearing in the A. I. Ch. E. Journal, vol. 5, No. 1, pages 54–60 (March 1959).

The types of openings in the foraminous members may be widely varied, the only requirement being that at least some of the openings be large enough to allow passage of the catalyst and reactants through them. More details concerning the numerous types and arrangement of openings in the foraminous members useful herein will be found in U.S. Patents Nos. 2,433,798; 2,740,698; 2,893,- 849; 2,893,851, and the aforementioned article appearing in the A. I. Ch. E. Journal. It is preferred that the openings in the foraminous members be rectangular, triangular, circular or oval in shape and that the size of the openings be within the limits of from 0.025 to 3 inches in diameter.

The amount of open area in the foraminous members may vary so long as it is within the limits of from 7.5 to 50% of the total internal cross-sectional area of the reactor. For more details concerning the open area in the foraminous members useful in the present invention see U.S. Patents Nos. 2,433,798; 2,893,849 and 2,893,851.

As has been pointed out earlier and will be seen in the examples which follow, the spacing of the foraminous members in the reactor is not a critical feature in the present process. Stated differently, it is not necessary that all of the communicating reactor compartments or chambers be of the same volume in the present process. Many types of spacing and arrangement of the foraminous members may be used and more details concerning spacing will be found in U.S. Patents Nos. 2,471,085; 2,- 823,219; 2,893,849 and 2,989,544. The use of rotatable foraminous members, such as that disclosed in U.S. Patent No. 2,893,851, is within the scope of the process of the instant invention but is not a preferred embodiment. In any event, it is preferred that the distance between any two foraminous members be at least about one inch and no greater than about three times the inside diameter of the reactor. It is more highly preferred for a given reaction compartment that the height be no greater than about two diameters of the internal cross section of the compartment.

It is often desirable and actually is preferred to include heat exchanger coils within the reactor compartments for better temperature control during the reaction. Such an arrangement is typified in U.S. Patents Nos. 2,676,668 and 2,893,851.

Because, as in most fluidized bed reactors, the catalyst fines often tend to be elutriated to some extent from the top of the reactor during the course of the reaction, it is convenient to expand the upper section of the reactor so that it acts as a disengaging section and it is often desirable to include at the top of the reactor means for recovering most or all of the catalyst fines as disclosed in U.S. Patents Nos. 2,494,614; 2,730,556; 2,893,849 and 2,- 893,851. After the aforementioned catalyst recovery it is also often convenient and even desirable to recycle the recovered catalyst fines through the reactor compartments by reintroducing them at a point near the bottom of the reactor as disclosed in U.S. Patents Nos. 2,494,614; 2,- 847,360 and in the aforementioned article appearing in the A. I. Ch. E. Journal. The catalyst fines may be recovered and recycled, for instance, by employing a filter and one or more cyclones or centrifuges at the upper section of the reactor and a dip-leg for reintroducing the recovered catalyst into the bottom or near the bottom of the reactor.

The reactor may be brought to the reaction temperature before or after the introduction of the reaction feed mixture. In a large-scale operation it is preferred to carry out the process in a continuous manner, and in such a system the recirculation of the unreacted olefin is contemplated. Periodic regeneration or reactivation of the catalyst is also contemplated, and this may generally be accomplished, for instance, by contacting the catalyst with air at an elevated temperature.

The reactor is, in essence, a sequence of several fluid beds with very limited back-flow of catalyst particles and vapor. Each reaction compartment is a nearly perfectly stirred reactor in which the gases being contacted experience a very short average contact time. Because this contact time is short, contact time distribution is also very sharp. The effect of multiplying this short, sharp contact time over several reaction compartments in the instant novel process is to produce an overall contact time distribution which is much sharper than that which could be achieved in a single conventional fluid bed reactor of the same total reaction space.

In accordance with the present invention, the gaseous reactants may all be introduced into the reactor at once; they may be introduced separately or in various combinations, provided that they are eventually mixed and contacted with the fluidized catalyst in a plurality of communicating reaction compartments.

The products of the reaction may be recovered by any of the methods known to those skilled in the art. One such method includes scrubbing the effluent gases from the reactor with cold water or an appropriate solvent to remove the products of the reaction. In such a case, the ultimate recovery of the products may be accomplished by conventional means. The efficiency of the scrubbing operation may be improved when water is employed as the scrubbing agent by adding a suitable wetting agent to the water. When molecular oxygen is used as the oxidizing agent in this process, the resulting product mixture remaining after removal of the nitriles may be treated to remove carbon dioxide while the remainder of the mixture containing the unreacted propylene and oxygen may be recycled through the reactor. When air is employed as the oxidizing agent in lieu of molecular oxygen, the residual product, after separation of the nitriles and the carbonyl products, may be scrubbed with a non-polar solvent, e.g., a hydrocarbon fraction, in order to recover unreacted propylene or other hydrocarbons which may have been included in the feed or formed in the reaction, and in this case, the remaining gases may be discarded. The addition of a suitable inhibitor to prevent polymerization of the unsaturated products during the recovery steps of the instant process is also contemplated.

In the examples, conventional auxiliary equipment, including meters, were employed for carrying out the reaction, and all the data reported herein are within the usual limits of experimental accuracy for such equipment. The products of the reactions were recovered by scrubbing the effluent gases from the reactor with water or hydrochloric acid solutions. The products were analyzed by conventional means, including mass spectrographic, gas chromatographic, and infrared spectrometric analyses, as well as conventional titration where such analyses were applicable.

The particular reactor employed was a 30-inch length of schedule 40 stainless steel pipe having an inside diameter of 3 inches and enclosed at the bottom. Near the bottom of the flat bottom reactor was a porous steel plate which served both as a catalyst support and as a sparging plate for air which was introduced into the reactor just below the sparging plate and below the point at which the propylene and ammonia were introduced. The trays forming the compartments in the reactor were removable and were hung from a central ¼ inch thermocouple well. The plates were spaced at any desired interval with ⅜ inch sleeves which slipped over the central thermocouple well. A nut at the bottom of the well held the whole assembly tight. The trays were cut circularly to fit with minimum clearance on the inside of the reactor. In operation, the entire reactor assembly was immersed in a temperature-controlled molten salt bath.

The effluent from the top of the reactor was chilled in a stainless steel Ross exchanger and at the same time quenched with a flow of fresh water or hydrochloric acid solution. The resulting condensate was collected in an ice-cooled receiver containing hydrochloric acid to neutralize excess ammonia. Off-gases from the first receiver were scrubbed in a second ice-cooled water scrubber and the non-condensables passed through a gas sampler bulb, and thence to a wet test gas meter.

Combined acidified aqueous scrubbing liquids were analyzed for acrylonitrile, as well as small amounts of carbonyls, by gas chromatography. Excess ammonia was determined by back titration of the acidified scrubbing liquid and HCN was determined by titration of this liquid also. The gas sample was analyzed chromatographically using the Fisher partitioner to give a direct measure of unreacted propylene, oxygen, carbon dioxide, and carbon monoxide.

Throughout this specification, the following definitions are employed:

Superficial linear gas velocity $$= \frac{\text{Vol. feed ft.}^3/\text{sec.}}{\text{Reactor cross-sect. area (ft.}^2)} = \text{ft./sec.}$$

$$\text{Contact time} = \frac{\text{Reactor height (ft.)}}{\text{Superficial linear gas velocity (ft./sec.)}} = \text{sec.}$$

Average linear gas velocity through the holes in the foraminous members $$= \frac{\text{Superficial linear gas vel.}}{\text{Percent open area}} = \text{ft./sec.}$$

Average linear gas velocity through the holes in the foraminous members $$= \frac{\text{Reactor height (ft.)}}{(\text{Percent open area}) (\text{contact time})} = \text{ft./sec.}$$

Percent conversions $$= \frac{\text{Weight of carbon in the product}}{\text{Weight of carbon in the propylene feed}} \times 100$$

Percent yield $$= \frac{\text{Weight of carbon in the product}}{\text{Total weight of carbon in the converted propylene}} \times 100$$

EXAMPLE I

A bismuth phosphomolybdate catalyst was prepared as follows:

A solution containing 9.3 cc. of 85% phosphoric acid, 272 g. of molybdic acid (85% MoO$_3$), 40 cc. of nitric acid, and 582 g. of Bi(NO$_3$)$_3$·5H$_2$O in 400 cc. of water was added to 750 g. of an aqueous colloidal silica sol containing 30% silica. The mixture was then evaporated to dryness and heated at 1000° F. for 16 hours. Subsequently, it was ground and screened to 40–100 mesh.

The foraminous members or trays used in this series of experiments were wire screen trays designated 9×9 mesh containing 0.069 inch holes with a total open area of 33% of the area of the reactor internal cross-section.

Constant conditions, i.e., a temperature of 900° F., a pressure of near atmospheric, and a mole ratio of feed of 10 air, 1 ammonia, and 1 water per mole of propylene were employed. The variables, which were changed systematically, were contact time in the range of from 4 to 8 seconds and the number of trays (or compartments) in the reactor.

A complete summary of these data is shown in Table I. The term "useful products" includes acrylonitrile and acetonitrile. Total conversion is based on conversion of propylene to all products including acrylonitrile, acetonitrile, HCN, CO$_2$ and CO. Listed are results from experiments conducted in the foregoing manner in the aforementioned reactor with no trays (open fixed fluidized bed), 3 trays, 5 trays, and 11 trays. The total fluidized catalyst bed depth was maintained throughout these experiments at 18 inches. Spacing of the trays was symmetrical in the case of the 5 and 11 tray sieves. The three-tray configuration was an unsymmetrical arrangement with bottom and top trays up to 3 inches from the bottom and down 3 inches from the top respectively, with the third tray spaced intermediate between the two.

Table I

|  | Percent conversion ||| Percent yield useful products | Contact time (sec.) |
|---|---|---|---|---|---|
|  | Acrylo-nitrile | Useful products | Total |  |  |
| No trays | 47.0 | 51.7 | 73.8 | 70.5 | 4 |
|  | 46.7 | 50.8 | 70.6 | 71.7 | 5 |
|  | 50.9 | 54.5 | 72.4 | 75.3 | 6 |
|  | 53.0 | 56.7 | 73.6 | 77.1 | 7 |
|  | 56.5 | 59.9 | 77.8 | 76.8 | 8 |
| Three trays | 50.4 | 55.6 | 74.5 | 74.8 | 4 |
|  | 53.4 | 57.3 | 73.7 | 77.7 | 5 |
|  | 58.6 | 62.2 | 78.3 | 79.5 | 6 |
|  | 60.2 | 63.6 | 81.6 | 78.0 | 7 |
|  | 61.9 | 64.4 | 83.4 | 77.2 | 8 |
| 5 trays | 59.6 | 64.5 | 80.8 | 79.8 | 4 |
|  | 60.5 | 66.0 | 85.5 | 77.3 | 5 |
|  | 65.0 | 68.7 | 89.1 | 77.1 | 6 |
|  | 66.1 | 70.0 | 91.5 | 76.5 | 7 |
|  | 67.7 | 72.8 | 91.8 | 79.3 | 8 |
| 11 trays | 62.8 | 66.9 | 81.4 | 82.2 | 4 |
|  | 67.5 | 74.5 | 91.5 | 81.3 | 5 |
|  | 67.2 | 71.0 | 91.0 | 78.0 | 6 |
|  | 71.1 | 74.8 | 93.2 | 80.2 | 7 |
|  | 70.1 | 74.4 | 89.4 | 83.2 | 8 |

EXAMPLE II

Two other tray types were tested at the 5-tray level in the manner more fully described in Example I. The trays were 1/16 inch thick steel plates cut to fit snugly inside of the reactor. One type of tray contained 1/4 inch in diameter circular holes, such that the total area of the holes was equivalent to 13.2% of the total tray area. The second tray type was a similar drilled plate, but the hole-size was 3/16 inch in diameter and the total open area was equal to 20% of the total tray area. Data for runs made in the reactor equipped with 5 trays and 11 trays, using each of these modifications are given in Table II.

Table II

|  | Percent conversion ||| Percent yield useful products | Contact time (sec.) |
|---|---|---|---|---|---|
|  | Acrylo-nitrile | Useful products | Total |  |  |
| 5 trays, 1/4″ holes | 56.0 | 63.4 | 78.3 | 81.0 | 4 |
|  | 62.4 | 66.4 | 84.9 | 78.2 | 5 |
|  | 63.9 | 67.7 | 85.8 | 79.0 | 6 |
| 5 trays, 3/16″ holes | 63.1 | 69.6 | 84.4 | 82.5 | 4 |
|  | 60.8 | 66.0 | 83.9 | 78.7 | 5 |
|  | 61.2 | 68.7 | 86.5 | 79.5 | 6 |
| 11 trays, 3/16″ holes | 64.0 | 71.4 | 87.1 | 81.9 | 4 |
|  | 63.5 | 70.8 | 90.8 | 78.0 | 5 |
|  | 63.2 | 70.2 | 91.6 | 76.7 | 6 |

It is apparent that the per pass conversion to acrylonitrile is not greatly dependent on tray hole-size and open areas within the range shown.

EXAMPLE III

The trays used were drilled plates with 20% open area and 3/16 inch holes. The reactor and procedures used are those more fully described in Example I. The 5 trays were uniformly (or symmetrically) spaced 3 inches apart in the reactor for one acrylonitrile preparation. The same 5 trays were then redistributed so that there was an open space of 8 inches between the air inlet sparging plate and the first tray (unsymmetrical). The remaining 4 trays were then crowded into the top 10 inch space at a spacing of 2 inches. The results are given in Table III.

Table III

|  | Percent conversion ||| Percent yield useful products | Contact time (sec.) |
|---|---|---|---|---|---|
|  | Acrylo-nitrile | Useful products | Total |  |  |
| Symmetrical spacing of trays | 59.0 | 63.7 | 80.0 | 79.6 | 4 |
| Unsymmetrical tray spacing | 60.3 | 65.2 | 79.9 | 81.7 | 4 |

EXAMPLE IV

The per pass conversion to acrylonitrile, the principal desired product, increases with contact time rapidly to 5 seconds after which there is a distinct leveling (Table IV). The procedure outlined in Example I wherein an 11 inch tray reactor was employed was followed. The variation of contact time was studied and the results are given in Table IV.

Table IV

| Contact time (sec.) | Percent conversion per pass to acrylonitrile |
|---|---|
| 1 | 17.1 |
| 2 | 35.2 |
| 3 | 48.5 |
| 4 | 52.8 |
| 5 | 61.6 |
| 6 | 60.5 |
| 7 | 58.8 |

EXAMPLE V

A catalyst system composed of antimony oxide and uranium oxide, having an Sb:U atomic ratio of 8:1 was prepared as follows: 90 g. of antimony metal was dissolved in 375 cc. of nitric acid (specific gravity of 1.42) and the mixture was heated until the evolution of oxides of nitrogen had ceased. To this solution was then added a suspension of 40.1 g. of uranyl acetate $$UO_2(C_2H_3O_2)_2 \cdot 2H_2O$$

in 400 cc. of water. 300 cc. of ammonium hydroxide solution was then added, and the filtered reaction slurry was washed with 600 cc. of water in three 200 cc. portions. The filter cake was dried at 120° C. overnight, calcined at 800° F. for 12 hours, and activated by heating at 1400° F. for 12 hours in a muffle furnace open to the atmosphere.

An apparatus similar to that used in Example I having an internal diameter of 1½ inches was employed with and without perforated trays. The perforated trays used each had 1/8 inch holes and 30% open area. In the reaction carried out in accordance with this invention, eleven trays were used and they were uniformly spaced 1½ inches apart through the reactor. The results of these experiments which were carried out in accordance with the procedure of Example I at a contact time of 7 seconds are given in Table V. The feed mixture was a 10:1:1.2:1 ratio of air:propylene:ammonia:water, respectively.

Table V

|  | Percent conversion ||
|---|---|---|
|  | Acrylonitrile | Useful products |
| No trays | 63.3 | 69.2 |
| 11 trays | 72.0 | 78.9 |

EXAMPLE VI

The procedure of Example V was repeated except that isobutylene was substitutde for propylene, four moles of water were used, a reaction temperature of 850° F. and a contact time of 6 seconds were employed. Much higher per pass conversions to methacrylonitrile were obtained in the 11 tray reactor than were obtained in the same reactor having no trays.

Results similar to the foregoing were obtained using as catalysts the combined oxides of antimony and iron, antimony and thorium, antimony and cerium and antimony and manganese.

We claim:

1. A process for preparing an olefinically unsaturated nitrile having the structure

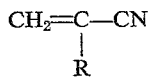

wherein R is a member selected from the group consisting of hydrogen and a methyl radical comprising contacting a mixture comprising a monoolefin having the structure

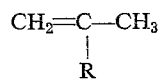

wherein R has the foregoing designation, ammonia and oxygen with a fluidized solid catalyst at a temperature in the range of 550 to 1000° F. at from about atmospheric pressure up to about 250 p.s.i.g. in at least four communicating reaction compartments, each communicated with and being separated from the next adjacent one by a foraminous member.

2. The process of claim 1 wherein the unsaturated nitrile is acrylonitrile and the monoolefin is propylene.

3. The process of claim 1 wherein the unsaturated nitrile is methacrylonitrile and the monoolefin is isobutylene.

4. The process of claim 1 wherein the fluidized solid catalyst is a member selected from the group consisting of the bismuth, tin and antimony salts of phosphomolybdic acid; the bismuth, tin and antimony salts of molybdic acid; bismuth silicomolybdate; bismuth silicophosphomolybdate and bismuth phosphotungstate.

5. The process of claim 2 wherein the fluidized solid catalyst is bismuth phosphomolybdate.

References Cited by the Examiner
UNITED STATES PATENTS

| | | | |
|---|---|---|---|
| 2,433,798 | 12/1947 | Voorhees | 196—52 |
| 2,471,085 | 5/1949 | Wilcox et al. | 196—52 |
| 2,823,219 | 2/1958 | Mungen | 260—449.6 |
| 2,847,360 | 8/1958 | Hemminger | 196—50 |
| 2,904,580 | 9/1959 | Idol | 260—465.3 |
| 3,009,943 | 11/1961 | Hadley et al. | 260—465.3 |

CHARLES B. PARKER, *Primary Examiner.*